June 11, 1963 B. MERLI ETAL 3,093,436

RECORDING MACHINE FOR A SHEET RECORD
HAVING TWO OPPOSITE RECORDING FACES

Filed Oct. 4, 1960 2 Sheets-Sheet 1

INVENTORS
BRUNO MERLI
& GIORGIO JANNUZZI

BY Kenyon & Kenyon
ATTORNEYS

INVENTORS
BRUNO MERLI
& GIORGIO JANNUZZI
BY Kenyon & Kenyon
ATTORNEYS

United States Patent Office 3,093,436
Patented June 11, 1963

3,093,436

RECORDING MACHINE FOR A SHEET RECORD HAVING TWO OPPOSITE RECORDING FACES

Bruno Merli and Giorgio Jannuzzi, Ivrea, Italy, assignors to Ing. C. Olivetti & C., S.p.A., Ivrea, Italy, a corporation of Italy Filed Oct. 4, 1960, Ser. No. 109,795
Claims priority, application Italy Oct. 7, 1959
6 Claims. (Cl. 346—125)

The invention relates to sound recording machines of the type comprising a rotatable drum with an endless surface about which a flexible record sheet is adapted to be wrapped through substantially one complete revolution with its leading edge attached to said drum, and further comprising a recording head travelling across one exposed face of said record.

The purpose of the present invention is to provide a recording machine of this type which is suitable for sheet records having two opposite recording faces to double the available recording time, however, still using a single recording head.

According to the invention, in a recording machine of such type having wrapping means for the record, we use a record which by its inherent resiliency is urged to keep flat when not engaged by said wrapping means, and we provide driving means for rotating said drum in either direction, and means controlled by said head upon completion of its travel for causing said driving means to reverse said direction, whereby when the trailing edge of said record has moved past said wrapping means the record by its resiliency unwraps from the drum and in the further course of the rotation thereof is caused by said wrapping means to be wrapped again through an opposite revolution to expose the other face to said recording head.

Further objects and features of the invention will be apparent from the following description of a preferred embodiment thereof, with reference to the accompanying drawings, in which.

Figures 1, 2, 3:
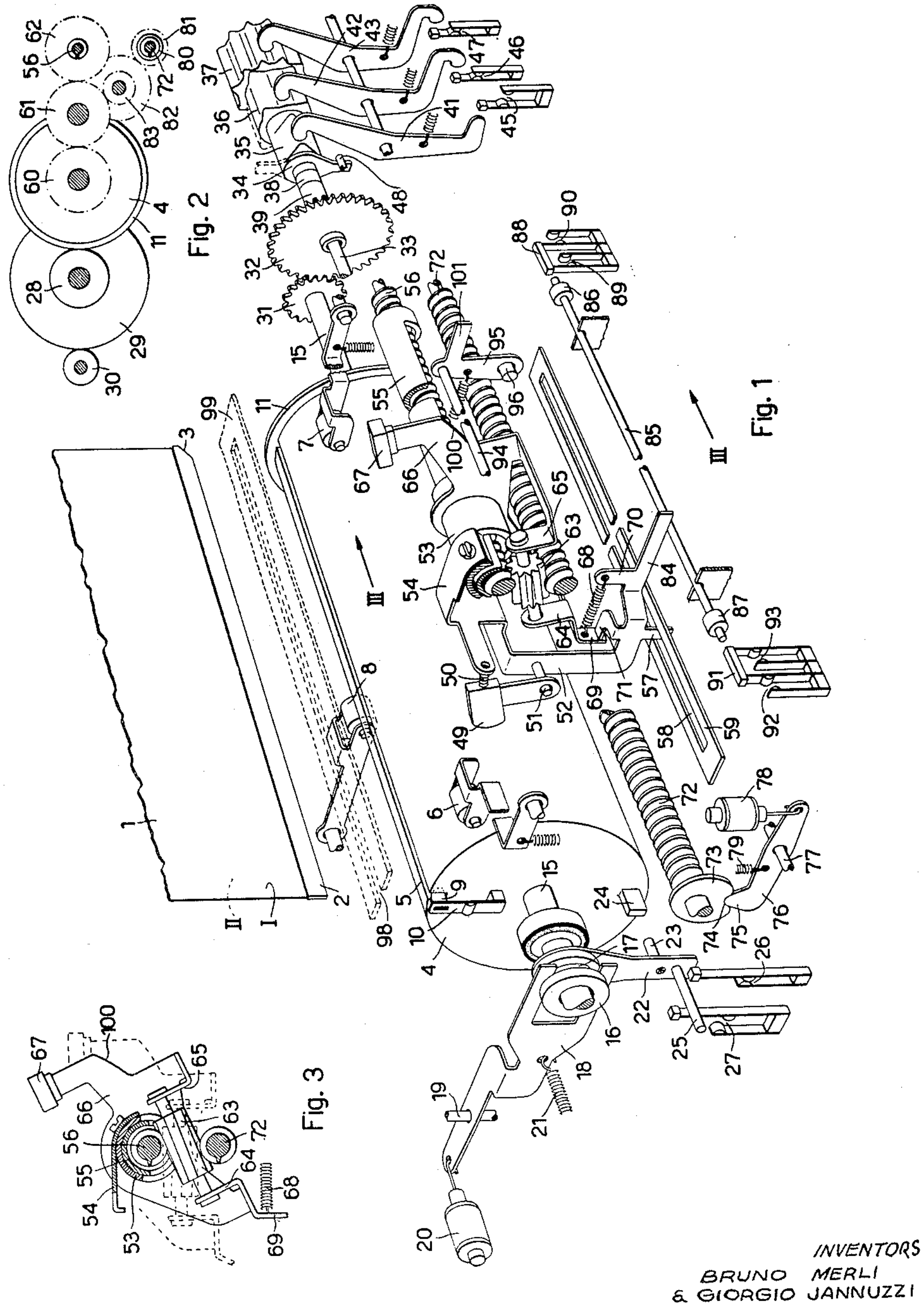
FIG. 1 shows a forwards partial perspective view of the machine according to the invention.
FIG. 2 shows a longitudinal sectional view of the driving mechanism of said machine.
FIG. 3 shows a left hand view of a detail of FIG. 2 according to arrows III—III.

With reference to FIG. 1, the record is made of a sheet of suitable bristol board or the like, which is flexible enough to be wrapped around a rotatable support drum 4 but which by its inherent resiliency is normally urged to keep flat. The record 1 is covered with magnetisable recording films upon each of its opposite faces I and II and is provided with a reinforced, non-magnetisable strip 2 having a visible mark, such as an inclined edge 3, provided to distinguish one face from the other face. The strip 2 may be introduced into a longitudinal slot 5 of the drum 4 and the record may be bent along the strip 2 to be wrapped through substantially one complete revolution with its leading edge 2 attached to said drum. Wrapping means are provided for said record, said wrapping means comprising two forward rollers 6, 7 and a rearward roller 8 engageable with the record. The slot 5 is limited on the right by a flange 11 secured to the drum, and on the left by a projection 9 of a leaf spring 10. A slot 98 formed in the outer casing 99 of the machine assists the operator in introducing the record into the drum.

Slidably mounted on the shaft 15 of the drum 4 is a sleeve 16 having a circular groove 17 housing a bifurcated lever 18 mounted on a pivot 19. The lever 18 is urged clockwise by a spring 21 and may be rocked counterclockwise against said urge by an electromagnet 20. Secured to the sleeve 16 is an arm 22 carrying a first pin 23 engageable with an element, such as a lug 24 of the drum 4, and a second pin 25 movable between suitable means for reversing the direction of rotation of the drum 4, such as two contacts 26 and 27.

The flange 11 is adapted to be driven by suitable driving means, such as a friction ring 28 (FIG. 2) fastened to a friction disc 29 driven by a motor shaft 30 for rotating the drum 4 in either direction.

The shaft 15 carries a pinion 31 (FIG. 1) meshing with a toothed wheel 32 having twice as many teeth as has the pinion 31. The wheel 32 is loosely mounted on a stationary shaft 33 and is provided with a hub 39 frictionally engaging a friction ring 38 which in turn frictionally engages a cam unit made of a cam arm 34 bodily connected with three integral cams 35, 36 and 37, the friction ring 38 and the cam unit 34–37 being loosely mounted as well on the shaft 33.

The cam unit 34–37 cooperates with a fixed stop 48 and with three cam-followers 41, 42, 43 controlling three contacts 45, 46, 47, respectively.

A recording head 49 travels parallel to the shaft 15 of the drum 4 across the exposed face I or II of the record wrapped around the drum 4 to record a helical track during one stroke of its travel. The head 49 is urged by a compression spring 50 to contact the drum 4 and is mounted on a pivot 51 secured to a frame 52 having a lug 54 secured to a sleeve 53 slidably mounted on a stationary transverse tube 55. The tube 55 houses a worm 56 embracing the full length of the drum 4 and journalled at its ends on the machine frame. The frame 52 is further provided with a projection 57 slidable in a slot 58 of a fixed plate 59.

The worm 56 is driven by the drum 4 by means of a pinion 60 (FIG. 2) secured to the drum, an intermediate pinion 61 and a pinion 62 secured to the worm, said three pinions having a like number of teeth, whereby at each revolution of the drum 4, corresponding to one turn of the magnetic track, the worm 56 rotates through one revolution as well.

The frame 52 (FIG. 1) is advanced by means of a worm wheel 63 (FIGS. 1 and 3) mounted between two lugs 64 and 65 of a key-lever 66 pivotally but not slidably mounted in a circular groove of the sleeve 53 and carrying a key 67. A spring tensioned between a further leg 69 of the key-lever 66 and a lug 70 of the frame 52 normally urges the lug 69 to contact a lug 71 of the frame 52, whereby the worm wheel 63 meshes both with the upper worm 56 and with a lower worm 72, as best seen in FIG. 3, the worm 72 being parallel with the worm 56 and journalled as well in the machine frame.

At its left hand end the worm 72 is provided with a disc 73 having a notch 74 normally engaged by a tooth 75 of a lever 76 mounted on the pivot 77 and urged clockwise by a spring 79, an electromagnet 78 being provided for rocking the lever 76 counterclockwise against the urge of said spring. At its right hand end the worm 72 is connected by means of a friction ring 80 (FIG. 2) to a pinion 81 meshing with a pinion 82 secured to a further pinion 83 which in turn meshes with the pinion 61. The number of teeth of the various pinions is such that at each revolution of the drum 4 the worm 72 is rotated through five revolutions. It will further be apparent from FIG. 2 that the worm is rotated in an opposite direction with respect to the drum 4 and the worm 56.

A further lug 84 of the frame 52 is slidable along a transverse rod 85 carrying two terminal stop rings 86 and 87 and axially slidable in the machine frame to engage either a bridge 88 of a couple of contacts 89, 90 or a bridge 91 of a couple of contacts 92, 93.

The key-lever 66 is provided with an inclined edge 100 cooperating with a universal bail 94 secured to a lever 95 mounted on a pivot 96 and having a projection 101.

The machine operates as follows:

At rest the cam unit 34–37 is in the position shown with broken lines in FIG. 1, rotated through 180° with respect to the position shown with full lines.

Upon introducing the strip 2 into the slot 5, the face I being directed forwards, the strip 2 is engaged by the projection 9 and is urged rightwards to abut against the flange 11. If now in a manner known per se the motor, not shown in the drawings, is started, the motor shaft 30 (FIG. 2) starts rotating clockwise, for instance, whereby the drum 4 is rotated clockwise as well. During this rotation the leading edge of the record 1 is moved first past the rollers 6 and 7 and then past the roller 8 whereby upon completion of the first revolution of the drum starting from the position shown in FIG. 1 the record 1 is wrapped through one complete revolution around the drum 4, the trailing edge of the record being held wrapped by the rollers 6 and 7. It will be apparent that the face I will now be exposed to the recording head 49.

During the first revolution of the drum 4 the cam unit 34–37 is driven counterclockwise by the friction ring 38 through half a revolution until the cam arm 34 is arrested by a fixed pin 48 (position shown in full lines in FIG. 1).

During said half revolution the cam 37 repeatedly rocks the cam-follower 43 clockwise to alternatively open and close the contact 47 which controls a circuit, not shown in the drawings, of a visual lamp; the cam 36 rocks the cam-follower 42 once clockwise to first open and then close the contact 46 inserted in a circuit, not shown in the drawings, feeding the electromagnet 20, to deenergize same; the cam 35 rocks the cam-follower 41 to the position shown in FIG. 1, wherein the contact 45 is opened to switch-in the amplifier of the machine in a manner known per se, the contact 45 being a short-circuiting contact in the amplifier circuit.

The clockwise rotation of the drum 4 is transmitted through the pinions 60, 61 and 62 to the worm 56, while the worm 72 remains locked by the lever 76. The worm 72 forms, therefore, a stationary rack on which the worm wheel 63 is caused by the clockwise rotation of the worm 56 to roll leftwards (as seen in FIG. 1). During the further revolutions of the drum 4 the frame 52 with the recording head 49 is thus gradually advanced leftwards bodily with the key-lever 66 and recording or reproducing upon the face I of the record may take place in the usual manner known per se.

Upon completion of the leftward travel of the recording head 49 in the course of the rotation of the drum 4 the lug 84 engages the stop ring 87 and shifts the rod 85 leftwards, thus closing the contacts 92 and 93. The contact 92 thus switches-in a conventional indicator, such as bell, telling the operator that the face of the record is terminated and that the reversing operation, to be now described, is started. The contact 93 is inserted in series with the contact 46 in the above mentioned circuit feeding the electromagnet 20, whereby, since the contact 46 is already closed, the electromagnet 20 is energized thus rocking the bifurcated lever 18 counterclockwise and shifting the sleeve 16 rightwards. The arm 22 shifts the pin 23 into the circular path of the lug 24, whereby when the drum 4 completes its clockwise revolution the lug 24 engages the pin 23 and rocks the arm 22 clockwise. The pin 25 closes the contact 27 thus energizing, in a manner known per se, a conventional relay for reversing the direction of rotation of the motor shaft 30. Therefore, the drum 4 is first arrested in the position shown in FIG. 1 and thereupon it starts rotating counterclockwise, whereby the lug 24 disengages the pin 23 and the contact 27 is opened.

The worm 56 reverses its direction of rotation as well and the recording head 49 is now advanced rightwards, whereby the stop ring 87 disengages the bridge 91. On the one hand the contact 92 switches out the above mentioned indicator, on the other hand the contact 93 is opened.

During the first two counterclockwise revolutions of the drum 4 the cam unit 34–37, which now rotates clockwise from the position shown in full lines in FIG. 1 through a full revolution before the arm 34 is arrested in front of the pin 48, repeats the above described operations as follows: the cam 37 causes the contact 47 of the lamp circuit to be repeatedly opened and closed; the cam 36 causes the contact 46 to be first opened to deenergize the electromagnet 20, whereby the bifurcated lever 18 is restored clockwise by the spring 21, whereupon the contact 46 is again closed without, however, affecting the electromagnet since in the meantime the contact 93 has been opened; the cam 35 causes the contact 45 to be first closed to switch-out the amplifier and then opened to switch-in the amplifier.

It has been said above that the drum 4 is first arrested in the position shown in FIG. 1 and then rotated counterclockwise. It will be apparent that, due to the inherent resiliency of the record, its trailing edge moves past the rollers 6 and 7 through the slot 98, whereby the record unwraps from the drum 4 and raises substantially flat from the slot 98 during the first counterclockwise revolution of the drum 4. During the second counterclockwise revolution of the drum the leading edge of the record 1 is moved first past the roller 8 and then past the rollers 6 and 7, whereby upon completion of said second revolution the record 1 is wrapped through one complete revolution around the drum 4 in the opposite direction, having now its face II exposed to the recording head 49. Therefore, upon completion of the face I the record is automatically reversed by reversing the direction of rotation of the drum 4 to expose the face II to the recording head.

As it has been described above, upon completion of the first two counterclockwise revolutions of the drum 4 the cam unit 34–37 has been arrested after one clockwise revolution in a position similar to that shown with full lines in FIG. 1. During the further counterclockwise revolutions of the drum 4 recording or reproducing upon the face II takes place in the usual manner known per se.

Upon completion of the rightward travel of the recording head 49 in the coure of the rotation of the drum 4 the lug 84 engages the stop ring 86 and shifts the rod 85 rightwards, thus closing the contacts 89 and 90 which are connected in parallel with the contacts 92 and 93, respectively. Therefore, the indicator is switched-in and the electromagnet 20 is energized whereby the sleeve 16 is shifted rightwards. When the drum 4 completes its counterclockwise revolution the lug 24 engages the pin 23 and rocks the arm 22 counterclockwise, thus opening the contact 26 and deenergizing, in a manner known per se, the reversing relay mentioned above. The drum 4 is first arrested in the position shown in FIG. 1 and thereupon it starts rotating clockwise, whereby the lug 24 disengages the pin 23 and the contact 26 is closed. Thereupon the record unwraps from the drum, its trailing edge moving now past the roller 8 through the slot 98 and upon completion of the first full clockwise revolution when the record raises substantially flat from the slot 98 and the cam unit 34—37 assumes the position shown with broken lines in FIG. 1, the machine has been restored to its initial condition.

It will be apparent that, instead of upon completion of a full stroke of the recording head 49, the record may be caused to be automatically reversed at will at whatever instant simply by energizing the electromagnet 20. Moreover, the stroke of the recording head 49 may be changed by altering the position of the stop rings 86 and 87 along the rod 85. To this end the stop rings 86 and 87 may be made suitably adjustable from the outside of the casing of the machine. An adjusted shorter stroke may be suitable for advertising purposes, for instance.

To remove the record from the drum at will the electromagnet 20 may be energized by a suitable control means adapted to stop the drum towards the end of one revolution after it has reversed its direction of rotation, whereby the record is in a sufficiently unwrapped position to be taken and removed by hand.

To retrograde the recording head 49 a variable amount with respect to its actual rightward or leftward recording travel to the end to reproduce the last portion of the recording, the electromagnet 78 is energized in a manner known per se, whereby the tooth 75 releases the disc 73 and the worm 72 is started rotating by the friction ring 80 contrary to the direction of rotation of the worm 56 but five times as fast. Therefore, the worm wheel 63 is now urged in opposed directions by the two worms 56 and 72, whereby due to the differential action of the worms the frame 52 is shifted four times as fast as before but in the opposite direction. As soon as the electromagnet 78 is deenergized and the lever 76 reengages the disc 73, the worm 72 is stopped and the frame 52 resumes its advancing travel in the prior direction.

To manually shift the recording head in either direction the key 67 is depressible to rock the key-lever 66 to the position shown with broken lines in FIG. 3, whereby the worm wheel 63 disengages from the worm 72 and the key 67 may be freely shifted, the worm wheel 63 rolling over the worm 56. Moreover, the inclined edge 100 engages the universal bail 94 to operate the usual controls.

To provide a visual indication of the end of a recording or a letter and/or a correction on a conventional indicator slip the following indicator unit is provided.

Figure 4:
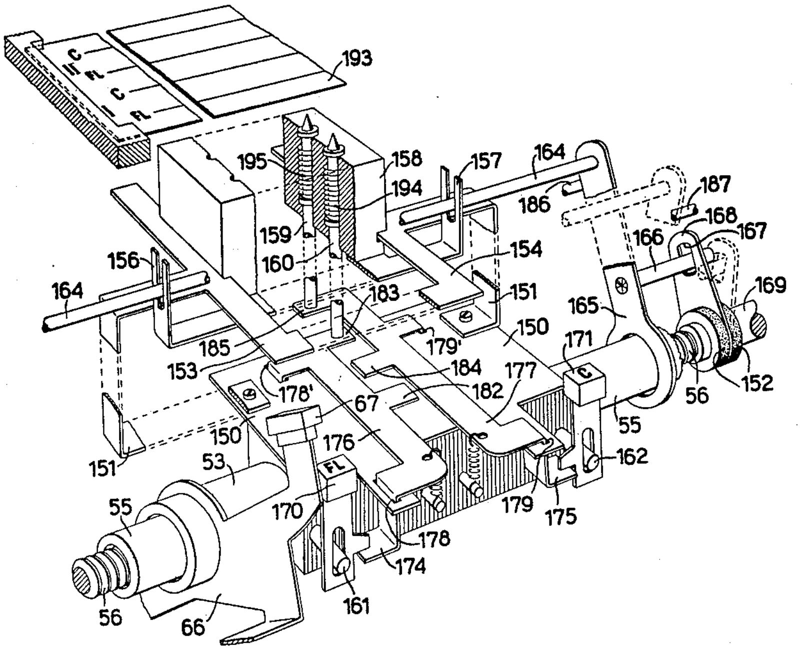
FIG. 4 shows a further forward partial perspective view of the machine.

Secured to the sleeve 53 (FIG. 4) is a support plate 150 carrying a frame 151 on whose arms 153 and 154 a carriage 158 is longitudinally slidable. The carriage 158 forms the indicator unit and to this end it is provided with two slidable punches 159 and 160, each one urged downwards by its springs 195 and 194, respectively. The carriage 158 is further provided with two bifurcated arms 156, 157 engaging a universal bail 164 secured to an arm 165. The arm 165 is pivotally mounted on the tube 55 and carries a pin 166 engaging a slot 167 of an arm 168 loosely mounted on the end 169 of the worm 56 and frictionally driven by a friction ring 152.

The support plate 150 further carries two pins 161, 162 slidably mounting two keys known per se, namely the recording or letter end indicating key 170 and the correction indicating key 171. The key 170 may engage a lug 174 of a lever 176 pivoted in two slots 178, 178′ of the plate 150 to rock said lever counterclockwise about an imaginary line connecting the two slots. Likewise, the key 171 may engage a lug 175 of a lever 177 pivoted in two slots 179, 179′ of the plate 150 to rock said lever clockwise about an imaginary line connecting the two slots. The levers 176 and 177 are each provided with two projections 182, 183 and 184, 185 respectively, longitudinally aligned with the punches 159 and 160.

The indicator unit operates as follows:

When recording upon the face II and thus during the counterclockwise rotation of the worm 56, the friction ring 152 drives the arm 168 counterclockwise and the arm 165 abuts against a fixed stop 186. In this position the carriage 158 sets the punches 159 and 160 below the portion "II" of a removable indicator slip 193 inserted in the casing of the machine. Upon depressing the keys 170 or 171 the projections 183 and 185, respectively, raise the punches 160 and 159, respectively, which correspondingly mark in a manner known per se the sub-portions "FL" and "C," respectively, of the portion "II" corresponding to the face "II" to provide a visual indication known per se.

When reversing the direction of rotation of the drum 4 to record upon the face I, the direction of rotation of the worm 56 is reversed as well, whereby the arm 168 is frictionally driven clockwise until the arm 165 abuts against a fixed stop 187. The carriage 158 is thus shifted forwards in such a position as to remove the punches 159 and 160 from the portion "II" of the indicator slip 193 and to set them below the portion "I" of said slip. Upon depressing the keys 170 or 171 the projections 182 and 184, respectively, raise the punches 160 and 159, respectively, which correspondingly mark the sub-portions "FL" and "C," respectively, of the portion "I" corresponding to the face I to provide a similar visual indication.

What we claim is:

1. In a recording machine having a frame, the combination comprising a rotatable drum mounted in said frame and having an endless surface about which a flexible sheet record is adapted to be wrapped through substantially one complete revolution, said record having a strip adapted to be folded with respect to its leading edge, said surface having a longitudinal slot for firmly receiving said strip, said record having two opposite recording faces and being normally urged by its inherent resiliency to keep flat, wrapping means mounted on said frame and spring urged to contact said surface for folding said record along said leading edge and wrapping same about said surface during the rotation thereof, a recording head mounted on said frame for travelling parallel to the axis of said drum across an exposed face of said record, driving means for selectively rotating said drum in forward and return drive, and means mounted on said frame at either end of the travel of said head and controlled by said head upon completion of its travel in either direction for causing said driving means to reverse said drive, whereby when upon completion of said travel the trailing edge of said record has moved past said wrapping means the record by its resiliency unwraps from the drum and finally unfolds along said leading edge and in the further course of the rotation thereof is caused by said wrapping means to be folded in an opposite direction along said leading edge and to be wrapped again through one revolution to expose the other face to said recording head.

2. A recording machine as defined in claim 1, characterized in that said head controlled means are adjustable to alter the stroke of said head.

3. A recording machine as defined in claim 1, characterized in that said drum carries an element which may be conditioned by said head controlled means to cause said reversal when said drum assumes a position enabling said strip to be introduced into or removed from said slot.

4. A recording machine as defined in claim 1, characterized by a control cam unit driven by said drum through a limited extent upon each reversal of its direction of rotation.

5. A recording machine as defined in claim 1, characterized in that the recording head is driven by a worm wheel mounted between two parallel worms which may be variably rotated to differentially drive the worm wheel in opposed directions and at different speeds.

6. A recording machine as defined in claim 1, characterized by an indicator unit for providing a visual end of recording or letter and/or correction indication on a removable indicator slip, said unit being settable in correspondence with either one of two portions of said slip according to the actual recording face of said record and being shifted between said portions concurrently with the reversal of the direction of rotation of said drum.

References Cited in the file of this patent

UNITED STATES PATENTS

| | | |
|---|---|---|
| 2,253,052 | Schubert et al. | Aug. 19, 1941 |
| 2,847,223 | Taylor et al. | Aug. 12, 1958 |